(12) United States Patent
Choi et al.

(10) Patent No.: US 10,548,101 B2
(45) Date of Patent: Jan. 28, 2020

(54) METHOD FOR ACCESSING MILLIMETER WAVE CELL IN WIRELESS COMMUNICATION SYSTEM AND APPARATUS THEREFOR

(71) Applicant: LG ELECTRONICS INC., Seoul (KR)

(72) Inventors: Kukheon Choi, Seoul (KR); Hyunsoo Ko, Seoul (KR); Kwangseok Noh, Seoul (KR); Dongkyu Kim, Seoul (KR); Sangrim Lee, Seoul (KR)

(73) Assignee: LG ELECTRONICS INC., Seoul (KR)

(*) Notice: Subject to any disclaimer, the term of this patent is extended or adjusted under 35 U.S.C. 154(b) by 13 days.

(21) Appl. No.: 15/550,349

(22) PCT Filed: Feb. 25, 2016

(86) PCT No.: PCT/KR2016/001865
§ 371 (c)(1),
(2) Date: Aug. 10, 2017

(87) PCT Pub. No.: WO2016/153182
PCT Pub. Date: Sep. 29, 2016

(65) Prior Publication Data
US 2018/0019901 A1    Jan. 18, 2018

Related U.S. Application Data

(60) Provisional application No. 62/135,726, filed on Mar. 20, 2015.

(51) Int. Cl.
*H04W 8/00* (2009.01)
*H04W 56/00* (2009.01)
(Continued)

(52) U.S. Cl.
CPC ......... *H04W 56/0005* (2013.01); *H04L 27/26* (2013.01); *H04L 43/04* (2013.01);
(Continued)

(58) Field of Classification Search
CPC . H04L 27/26; H04L 27/2613; H04L 27/2692; H04L 27/0006; H04L 43/04;
(Continued)

(56) References Cited

U.S. PATENT DOCUMENTS

2014/0003369 A1    1/2014   Josiam et al.
2014/0120926 A1*   5/2014   Shin ...................... H04W 56/00
                                                                    455/450
(Continued)

FOREIGN PATENT DOCUMENTS

JP    2013048461    3/2013
JP    2014126972    7/2014
(Continued)

OTHER PUBLICATIONS

PCT International Application No. PCT/KR2016/001735, Notification of Transmittal of the International Search Report and the Written Opinion of the International Searching Authority, or Declaration dated May 25, 2016, 8 pages.

(Continued)

*Primary Examiner* — Redentor Pasia
*Assistant Examiner* — Rasha K Fayed
(74) *Attorney, Agent, or Firm* — Lee Hong Degerman Kang & Waimey

(57) ABSTRACT

A method for accessing a millimeter wave cell by a terminal in a wireless communication system supporting a millimeter wave according to an embodiment of the present invention comprises the steps of: receiving a millimeter wave link connection configuration message from a legacy cell that is radio resource control (RRC)-connected to the terminal;

(Continued)

measuring discovery signals from the millimeter wave cells located around the terminal on the basis of the millimeter wave link connection configuration message; and transmitting a first type random access preamble to one of the millimeter wave cells on the basis of a result of the measuring of the discovery signals, wherein the measuring of the discovery signals is performed on the basis of a signal detection wave form that is specifically configured for each millimeter wave cell.

10 Claims, 15 Drawing Sheets

(51) Int. Cl.
    *H04L 27/26*     (2006.01)
    *H04W 74/08*     (2009.01)
    *H04L 12/26*     (2006.01)
    *H04W 48/12*     (2009.01)

(52) U.S. Cl.
    CPC ............ *H04L 43/08* (2013.01); *H04W 8/005* (2013.01); *H04W 48/12* (2013.01); *H04W 56/00* (2013.01); *H04W 74/08* (2013.01); *H04W 74/0833* (2013.01)

(58) Field of Classification Search
    CPC ..... H04L 43/08; H04L 5/0048; H04L 5/0026; H04L 5/00; H04L 5/0053; H04L 5/0007; H04L 5/001; H04L 5/0023; H04W 74/08; H04W 74/0833; H04W 48/12; H04W 48/14; H04W 48/18; H04W 48/16; H04W 8/005; H04W 56/00; H04W 56/0045; H04W 56/0005; H04W 56/001; H04W 28/04; H04W 28/08; H04W 64/003; H04W 16/28; H04W 16/14; H04W 88/08; H04W 88/06; H04W 36/22; H04W 4/02; H04W 4/50; H04W 4/06; H04B 7/0617; H04B 7/0619; H04B 7/0802; H04B 7/0456; H04B 7/0639; H04B 7/0874; H04B 7/088; H04B 7/0628

USPC ................................. 370/328, 329; 455/450
See application file for complete search history.

(56) References Cited

U.S. PATENT DOCUMENTS

| | | | |
|---|---|---|---|
| 2015/0146631 A1* | 5/2015 | Kim .................. | H04W 74/0833 370/329 |
| 2015/0312784 A1* | 10/2015 | You ....................... | H04L 1/0693 370/252 |
| 2015/0326359 A1* | 11/2015 | Subramanian ........ | H04L 5/0023 370/330 |
| 2016/0192433 A1* | 6/2016 | Deenoo ............... | H04W 72/046 370/329 |
| 2016/0198474 A1* | 7/2016 | Raghavan ......... | H04W 72/0466 370/335 |
| 2016/0219475 A1* | 7/2016 | Kim ......................... | H04L 5/00 |
| 2016/0345216 A1* | 11/2016 | Kishiyama ........ | H04W 36/0083 |
| 2018/0249461 A1* | 8/2018 | Miao ..................... | H04W 48/16 |

FOREIGN PATENT DOCUMENTS

| | | |
|---|---|---|
| KR | 1020130034827 | 4/2013 |
| KR | 1020130105706 | 9/2013 |
| KR | 1020140041765 | 4/2014 |
| KR | 1020140102278 | 8/2014 |
| WO | 2014113103 | 7/2014 |
| WO | 2015002465 | 1/2015 |

OTHER PUBLICATIONS

PCT International Application No. PCT/KR2016/001865, Notification of Transmittal of the International Search Report and the Written Opinion of the International Searching Authority, or Declaration dated May 31, 2016, 15 pages.

Jeong, Cheol et al., "Random Access in Millimeter-Wave Beamforming Cellular Networks: Issues and Approaches," Millimeter-Wave Communications for 5G, IEEE Communications Magazine, Jan. 2015, 6 pages.

United States Patent and Trademark Office U.S. Appl. No. 15/516,606, Notice of Allowance dated Jun. 15, 2018, 13 pages.

* cited by examiner

Tk
Time for UE having predetermined
beamwidth for one BS beam direction to
scan in all directions $T_{tx\_scan}$ Pilot transmission on determined Rx bam and
TX beam determination

METHOD FOR ACCESSING MILLIMETER WAVE CELL IN WIRELESS COMMUNICATION SYSTEM AND APPARATUS THEREFOR

CROSS-REFERENCE TO RELATED APPLICATIONS

This application is the National Stage filing under 35 U.S.C. 371 of International Application No. PCT/KR2016/001865, filed on Feb. 25, 2016, which claims the benefit of U.S. Provisional Application No. 62/135,726, filed on Mar. 20, 2015, the contents of which are all hereby incorporated by reference herein in their entirety.

TECHNICAL FIELD

The present invention relates to a wireless communication system, and more particularly, to a method for a user equipment connected to a legacy cell to access a millimeter wave (mmWave) cell and apparatus therefor.

BACKGROUND ART

A wireless access system has been widely developed to provide various kinds of communication services such as voice and data. Generally, the wireless access system is a multiple access system that can support communication with multiple users by sharing available system resources (bandwidth, transmission power, etc.). Examples of the multiple access system include a code division multiple access (CDMA) system, a frequency division multiple access (FDMA) system, a time division multiple access (TDMA) system, an orthogonal frequency division multiple access (OFDMA) system, and a single carrier frequency division multiple access (SC-FDMA) system.

Recently, a mmWave-based wireless communication system having higher frequency properties than cellular systems has been studied. The mmWave-based wireless communication system requires a synchronization method in consideration of mmWave propagation properties.

DISCLOSURE OF THE INVENTION

Technical Task

One technical task of the present invention is to provide a method and apparatus for a user equipment connected to a legacy cell to access a millimeter wave cell efficiently.

Technical tasks obtainable from the present invention are non-limited by the above-mentioned technical task. And, other unmentioned technical tasks can be clearly understood from the following description by those having ordinary skill in the technical field to which the present invention pertains.

Technical Solutions

To achieve the above technical tasks, in one technical aspect of the present invention, provided herein is a method for a user equipment to access a millimeter wave cell in a wireless communication system supporting millimeter wave (mmWave), including receiving a mmWave connection configuration message from a legacy cell which is radio resource control (RRC) connected to the user equipment, measuring discovery signals from mmWave cells adjacent to the user equipment based on the mmWave connection configuration message, and transmitting a first type random access preamble to one of the mmWave cells based on a measurement result of the discovery signals, wherein the measurement of the discovery signals is performed based on a signal detection waveform that is configured to be specific to each of the mmWave cells.

In another technical aspect of the present invention, provided herein is a user equipment supporting a millimeter wave (mmWave), including a receiver to receive a mmWave connection configuration message from a legacy cell which is radio resource control (RRC) connected to the user equipment, a processor to measure discovery signals from mmWave cells adjacent to the user equipment based on the mmWave connection configuration message, and a transmitter to transmit a first type random access preamble to one of the mmWave cells based on a measurement result of the discovery signals, wherein the measurement of the discovery signals is performed based on a signal detection waveform that is configured to be specific to each of the mmWave cells.

Preferably, the mmWave connection configuration message may include signal detection waveforms of the mmWave cells and information on a timing in which the each signal detection waveform is used.

Preferably, in measuring the discovery signals, the user equipment may perform autocorrelation total N×M times based on the signal detection waveform specific to the each of the mmWave cells and detect a beamforming direction and a mmWave cell corresponding to an autocorrelation in which a peak is maximized among the N×M autocorrelations, 'N' may indicate a number of the mmWave cells, and 'M' may indicate beamforming resolution of the discovery signals.

More preferably, a frame of the detected mmWave cell may start at a second point that is offset from a first point in which the peak of the autocorrelation is maximized and a size of the offset may be an integer multiple of a discovery signal length included in the mmWave connection configuration message.

More preferably, the mmWave cell to which the first type random access preamble is transmitted may include the mmWave cell corresponding to the autocorrelation in which the peak is maximized.

Preferably, the mmWave cells may belong to a timing advance group (TAG) of the user equipment and the mmWave cells in the TAG may transmit the discovery signals through different waveforms and different frequency resources.

Preferably, the mmWave connection configuration message may include a mmWave discovery measurement timing configuration (DMTC) indicating a measurement periodicity and a measurement duration of the discovery signals and the measurement periodicity and the measurement duration indicated by the mmWave DMTC may be configured to be smaller than a measurement periodicity and a measurement duration indicated by a legacy DMTC, respectively.

Preferably, the user equipment may perform a primary timing advance (TA) correction based on a response to the first type random access preamble and the transmitter may transmit a second type random access preamble to the mmWave cell based on an uplink synchronization timing which is corrected by the primary TA correction.

Advantageous Effects

According to one embodiment of the present invention, as informations required for accessing a millimeter wave cell are signaled from a legacy cell, a user equipment can efficiently access a millimeter wave cell. And, since a specific signal detection waveform is set for each millimeter wave cell belonging to a TAG of a user equipment, a millimeter wave cell to be accessed by the user equipment can be accurately detected.

Effects obtainable from the present invention are non-limited by the above mentioned effect. And, other unmentioned effects can be clearly understood from the following description by those having ordinary skill in the technical field to which the present invention pertains.

DESCRIPTION OF DRAWINGS

The accompanying drawings, which are included to provide a further understanding of the invention and are incorporated in and constitute a part of this specification, illustrate embodiments of the invention and together with the description serve to explain the principles of the invention. And, the accompanying drawings are used to describe embodiments of the present invention together with the detailed description.

BEST MODE FOR INVENTION

Figure 1A:
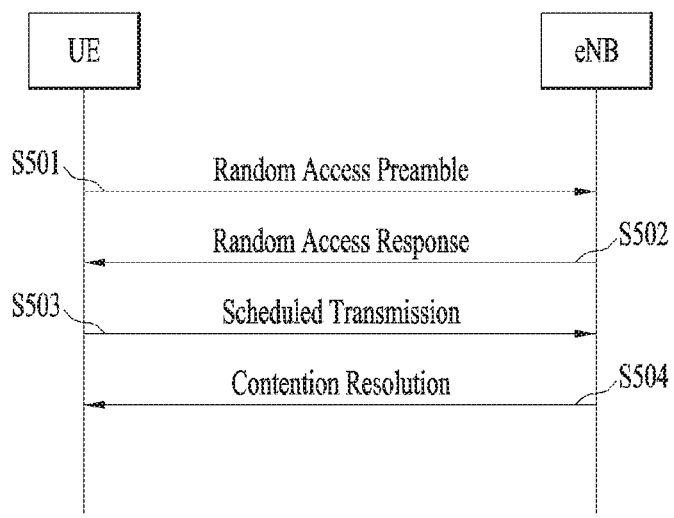
FIG. 1a shows a random access process of an LTE system.

The embodiments of the present invention described hereinbelow are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment.

In the description of drawings, procedures or steps, which may obscure the substance of the present invention, are not explained. In addition, procedures or steps, which can be understood by those skilled in the art, are not explained.

Throughout the specification, when it is said that some part "comprises or includes" a specific element, this means that the part may further include other elements, not excluding them, unless otherwise mentioned. The terms "-er(or)", "module", "portion" and "part" are used to signify a unit performing at least one function or operation. The unit can be realized in hardware, software, or in a combination thereof. In addition, as used herein, the singular forms "a", "an" and "the" are intended to include the plural forms as well, unless the context clearly indicates otherwise.

In the embodiments of the present invention, a description is given, centering on a data transmission and reception relationship between a base station (BS) and a user equipment (UE). The BS is a terminal node of a network, which communicates directly with a UE. In some cases, a specific operation described as performed by the BS may be performed by an upper node of the BS.

Namely, it is apparent that, in a network comprised of a plurality of network nodes including a BS, various operations performed for communication with a UE may be performed by the BS, or network nodes other than the BS. The term "BS" may be replaced with the term "fixed station", "Node B", "eNode B (eNB)", "advanced base station (ABS)", "Access Point", etc.

In addition, the term "terminal" in embodiments of the present invention may be replaced with the term "user equipment (UE)", "mobile station (MS)", "mobile subscriber station (MSS)", "subscriber station (SS)", "mobile terminal", "advanced mobile station (AMS)", etc.

Further, a transmitting side refers to a fixed node and/or a moving node that provide data services and audio services and a receiving side refers to a fixed node and/or a moving node that receive the data services or audio services. Accordingly, a UE may be a transmitting side and a BS may be a receiving side on uplink. Similarly, a UE may be a receiving side and a BS may be a transmitting side on downlink.

The embodiments of the present invention can be supported by standard documents disclosed for at least one of IEEE 802.xx, 3rd Generation Partnership Project (3GPP), 3GPP LTE, and 3GPP2. Particularly, the embodiments of the present invention can be supported by documents 3GPP TS 36.211, 3GPP TS 36.212, 3GPP TS 36.213, 3GPP TS 36.321 and 3GPP TS 36.331. That is, steps or parts that are not described to clarify the technical features of the present invention can be supported by such documents. Further, all terms as set forth herein can be explained by the standard documents.

Reference will now be made in detail to the preferred embodiments of the present invention with reference to the accompanying drawings. The detailed description, which will be given below with reference to the accompanying drawings, is intended to explain exemplary embodiments of the present invention, rather than to show the only embodiments that can be implemented according to the invention.

Specific terms used in the embodiments of the present invention are provided to aid in understanding of the present invention. These specific terms may be replaced with other terms within the scope and spirit of the present invention.

For example, a cellular system may refer to LTE or LTE-A and a mmWave system may refer to a system that supports mmWave in LTE or LTE-A. That is, the mmWave system refers to a wireless access system supporting mmWave characteristics. In the embodiments of the present invention, the term "ray" can refer to a unique signal or a cluster of unique signals, which is generated in a mmWave link when beamforming is not performed.

Hereinafter, 3GPP LTE/LTE-A will be described as an exemplary wireless access system that can be used in embodiments of the present invention.

Techniques described herein can be used in various wireless access systems such as code division multiple access (CDMA), frequency division multiple access (FDMA), time division multiple access (TDMA), orthogonal frequency division multiple access (OFDMA), single carrier-frequency division multiple access (SC-FDMA), etc.

CDMA may be implemented as a radio technology such as Universal Terrestrial Radio Access (UTRA) or CDMA2000. TDMA may be implemented as a radio technology such as Global System for Mobile communications (GSM)/General Packet Radio Service (GPRS)/Enhanced Data Rates for GSM Evolution (EDGE). OFDMA may be implemented as a radio technology such as IEEE 802.11 (Wi-Fi), IEEE 802.16 (WiMAX), IEEE 802.20, Evolved-UTRA (E-UTRA) etc.

UTRA is a part of Universal Mobile Telecommunication System (UMTS). 3GPP LTE is a part of Evolved UMTS (E-UMTS) using E-UTRA. 3GPP LTE employs OFDMA for downlink and SC-FDMA for uplink. LTE-A is an evolution of 3GPP LTE. For clarity, the embodiments of the present invention focus on 3GPP LTE/LTE-A. However, the embodiments of the present invention are applicable to IEEE 802.16e/m.

Random Access in LTE/LTE-A System

A random access procedure in LTE will be described first.

FIG. 1a illustrates operations of a UE and an eNB in a contention-based random access procedure.

(1) Transmission of First Message

The UE may select a random access preamble randomly from a random preamble set indicated by system information or a handover command, select Physical Random Access CHannel (PRACH) resources, and transmit the random access preamble through selected Physical PRACH (PRACH) resources (S501).

(2) Reception of Second Message

After transmitting the random access preamble in step S501, the UE attempts to receive a random access response within a random access response reception window indicated through the system information or the handover command by the eNB (S502). To be more specific, the random access response may be transmitted in the form of a Medium Access Control Protocol Data Unit (MAC PDU) and the MAC PDU may be delivered over a Physical Downlink Shared CHannel (PDSCH). To receive information on the PDSCH successfully, the UE preferably monitors a Physical Downlink Control CHannel (PDCCH). That is, the PDCCH preferably carries information about a UE to receive the PDSCH, information about the frequency and time of radio resources of the PDSCH, and information about the transmission format of the PDSCH. Once the UE succeeds in receiving the PDCCH destined therefor, the UE may successfully receive a random access response over the PDSCH according to information carried over the PDCCH. The random access response may include an identifier (ID) of the random access preamble (e.g. a Random Access Preamble ID (RAPID)), an Uplink (UL) Grant indicating uplink radio resources, a temporary Cell-Radio Network Temporary Identify (C-RNTI), and a Timing Advance Command (TAC).

The reason for including the RAPID in the random access response is that because one random access response may contain random access response information for one or more UEs, it is necessary to indicate a UE to which the UL Grant, the temporary C-RNTI, and the TAC are valid. It is assumed in step S502 that the ID of the random access preamble is identical to the RAPID included in the random access response. Thus, the UE may receive the UL Grant, the temporary C-RNTI, and the TAC.

(3) Transmission of Third Message

Upon receipt of a valid random access response, the UE processes information included in the random access response. That is, the UE applies the TAC and stores the temporary C-RNTI. In addition, the UE may store data to be transmitted in a message3 buffer in correspondence with the reception of a valid random access response.

Meanwhile, the UE transmits data (i.e. a third message) to the eNB using the received UL Grant (S503). The third message should include an ID of the UE. In the contention-based random access procedure, the eNB cannot identify UEs that perform the random access procedure. However, the eNB should identify the UEs to avoid later-collision among them.

Two methods have been discussed to include the ID of the UE in the third message. One of the methods is that if the UE has a valid C-RNTI allocated by the cell before the random access procedure, the UE transmits its C-RNTI in an uplink signal corresponding to the UL Grant. On the other hand, if a valid C-RNTI has not been allocated to the UE before the random access procedure, the UE transmits its UE ID (e.g. S-TMSI or a random ID) in data. In general, the UE ID is longer than the C-RNTI. If the UE transmits data corresponding to the UL Grant, the UE activates a Contention Resolution (CR) timer to avoid contention.

(4) Reception of Fourth Message

After transmitting its ID in data according to the UL Grant included in the random access response, the UE awaits reception of a command for contention resolution from the eNB. That is, the UE attempts to receive a PDCCH in order to receive a specific message (S504). For PDCCH reception, two methods may be considered. When the third message is transmitted using the C-RNTI according to the UL Grant as described above, the UE attempts to receive a PDCCH using the C-RNTI. If the ID included in the third message is the UE ID, the UE may attempt to receive a PDCCH using the temporary C-RNTI included in the random access preamble.

In the former case, if the UE receives a PDCCH using the C-RNTI before expiration of the CR timer, the UE ends the random access procedure, determining that the random access procedure has been performed normally. In the latter case, if the UE receives a PDCCH using the temporary C-RNTI before expiration of the CR timer, the UE checks data received on a PDSCH indicated by the PDCCH. If the data includes its UE ID, the UE ends the random access procedure, determining that the random access procedure has been performed normally. Meanwhile, a contention free random access procedure is ended only by transmitting first and second messages, which is different from the contention-based random access procedure shown in FIG. 1A. However, the UE is allocated a random access preamble by the eNB before it transmits a random access preamble as the first message to the eNB. The UE transmits the allocated random access preamble as the first message to the eNB, and ends the random access procedure by receiving a random access response from the eNB.

Meanwhile, a contention free random access procedure is ended only by transmitting first and second messages, which is different from the contention-based random access procedure shown in FIG. 1A. However, the UE is allocated a random access preamble by the eNB before it transmits a random access preamble as the first message to the eNB. The UE transmits the allocated random access preamble as the first message to the eNB, and ends the random access procedure by receiving a random access response from the eNB.

Discovery Measurement Timing Configuration in LTE/LTE-A

Recently, a discovery signal for a discovery of a small cell is introduced into an LTE system. Such a discovery procedure is provided to support efficient power management for a discovery of a small cell and discover small cells as many as possible at a time. And, the discovery procedure is useful in detecting some target small cells from concentrated small cells efficiently.

Figure 1B:
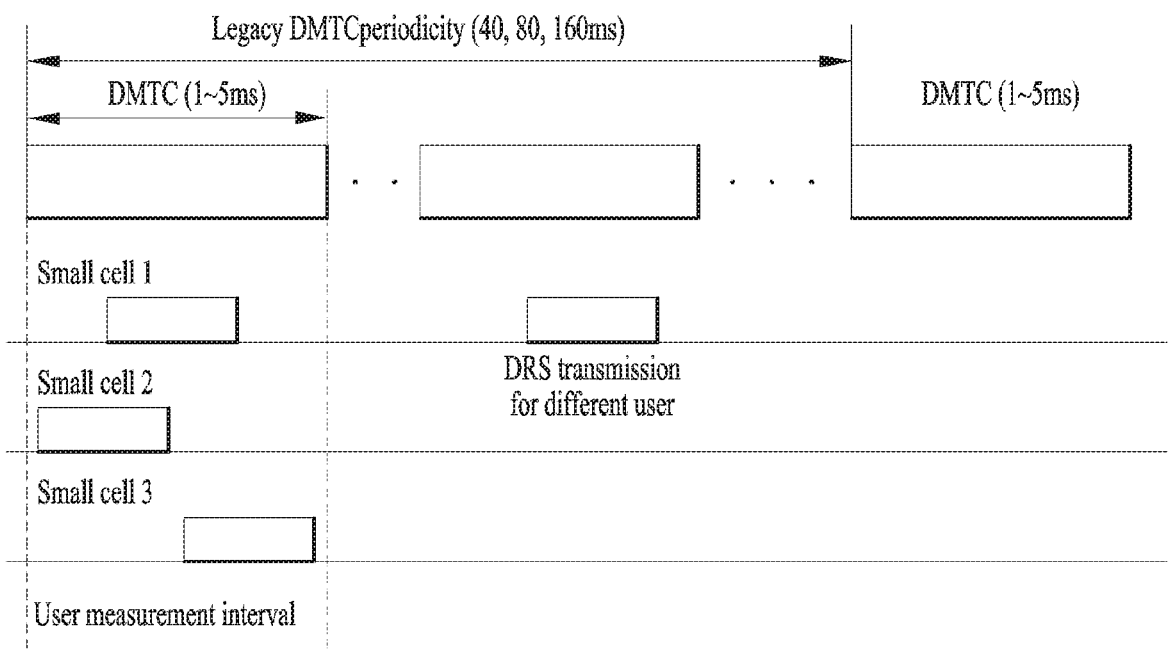
FIG. 1b shows DMTC of an LTE system.

A discovery signal includes at least one of CRS, PSS, SSS and CSI-RS. DMTC (Discovery measurement timing configuration), which is a measurement timing setting for a discovery signal, is provided to a user equipment (UE) through RRC signaling. FIG. 1b shows a structure of DMTC. Referring to FIG. 1b, DMTC can be set with a periodicity of 40, 80, or 160 ms. The DMTC has an offset of 0 or 1 at a PCell or system frame index and its length is fixed (e.g., 6 ms). The user equipment performs RRM measurement (e.g., RSRP, RSRQ) on a discovery signal based on the DMTC and reports a measurement result to a base station. The discovery procedure is performed by a user equipment in RRC-connected state.

mmWave Beam Scanning

Hereinafter, mmWave beam scanning methods will be briefly described.

Figure 2:
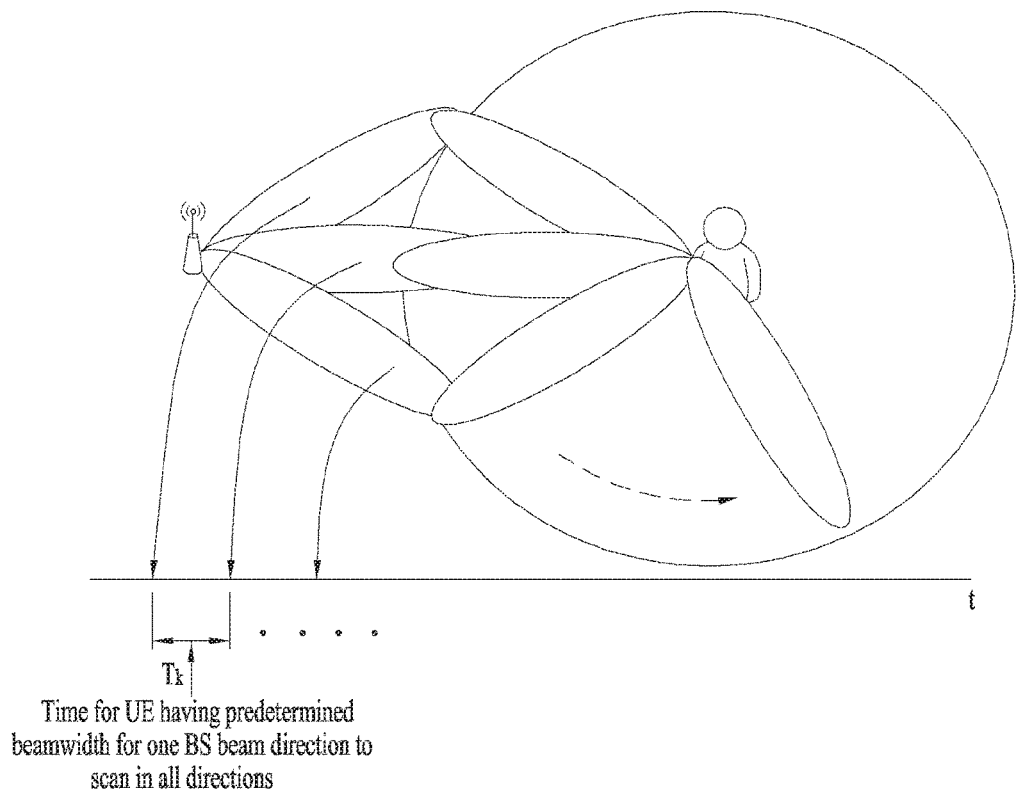
FIG. 2 shows an initial step of a reception scanning for a transmitted beam scanning according to one embodiment of the present invention.
Figure 3:
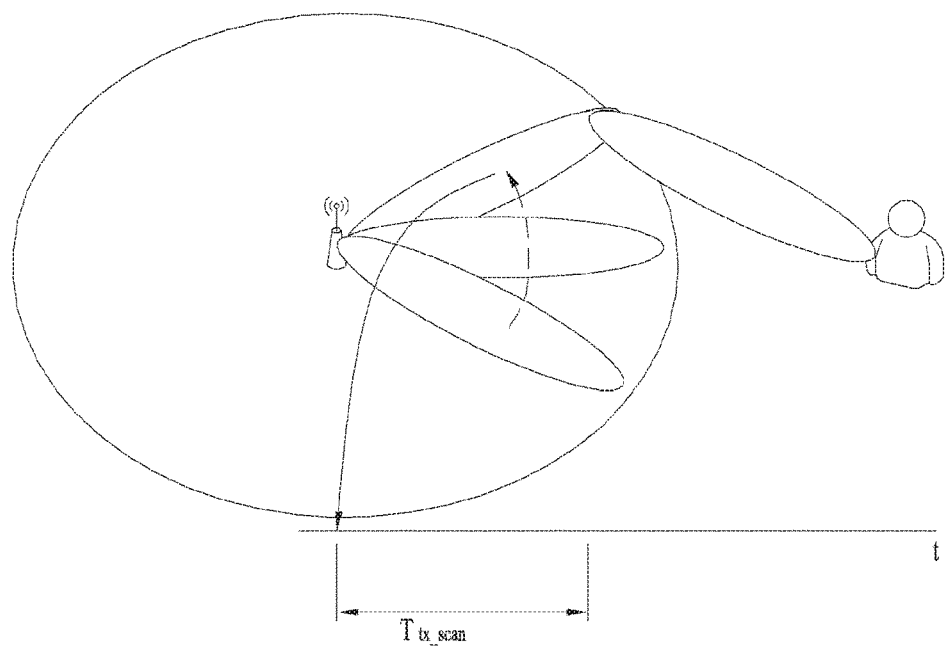
FIG. 3 shows a method of performing a beam scanning at a transmitting end after fixing a received lobe index on a receiving side according to one embodiment of the present invention.

FIG. 2 illustrates an initial stage of reception beam scanning for transmission beam scanning according to an embodiment of the present invention and FIG. 3 illustrates a method of performing beam scanning at a transmitting side after a reception lobe index is fixed at a receiving side.

When a transmission beam codebook of a base station is determined in an initial stage of beam scanning, a receiving side, that is, a UE detects a power delay profile (PDP) according to each beam while performing 360-degree reception beam scanning with the corresponding transmission beam fixed. Here, the UE selects the index of a reception lobe having a ray with highest power from among detected PDPs. A lobe refers to each radiation group when energy of radiation from an antenna is distributed in multiple directions. That is, a lobe refers to a form of beam in beam scanning.

Formula 1 is used to calculate an SNR of each lobe detected by the UE.

$$\underset{i}{\operatorname{argmax}}|H_i^{(k)} w_i|^2 \frac{p_i^2}{\sigma_n^2} \qquad \text{[Formula 1]}$$

In Formula 1, $H_i^{(k)}$ denotes a radio channel of an i-th lobe with respect to a transmission beam k, $w_i$ denotes a precoding matrix, $p_i$ indicates received power, $\sigma$ indicates a noise level, and the square of $\sigma$ indicates noise power.

When a time when reception beam scanning for a fixed transmission beam lobe is completed is defined as $\tau_k$, as illustrated in FIG. 3, $\tau_k$ may be determined by Formula 2.

$$\tau_k = N(\tau_{excess\_delay} + \tau_{prop\_delay} + \tau_{process\_delay}) \qquad \text{[Formula 2]}$$

In Formula 2, $\tau_{excess\_delay}$ is an excess delay spread value that refers to a maximum delay time necessary for repeated beam scanning at a receiving side $\tau_{prop\_delay}$ is a transmission delay value, $\tau_{process\_delay}$ denotes a PDP measurement time and a strong ray detection time with respect to each reception beam lobe, and N indicates the number of beam lobes of the receiving side.

The receiving side repeats the aforementioned process while changing transmission beam lobes 1 to K 360 degrees. Accordingly, the beam scanning completion time of the receiving side is $M_{\tau_k}$. Here, K indicates a total number of transmission beams.

Referring to FIG. 3, when the receiving side, a UE, completes beam scanning, the UE transmits a pilot signal to a mmWave base station. Then, the UE performs 360-degree beam scanning in order to determine a lobe index of a transmitting side. Accordingly, the transmission/reception beam scanning completion time becomes $K_{\tau_k} \tau_{tx\_scan}$.

In the following table 1, parameters for beam scanning completion time measurement are defined.

TABLE 1

| | |
|---|---|
| $\tau_{excess\_delay}$ | 1 μs |
| $\tau_{prop\_delay}$ | 5 μs |
| $\tau_{process\_delay}$ | 670 μs |
| N (beamwidth = 36 degree) | 100 (vertical + horizontal) |
| K (beamwidth = 36 degree) | 100 (vertical + horizontal) |
| $\tau_{tx\_scan}$ | 100 * 670 μs |

If parameters for beam scanning are defined as shown in Table 1, the transmission/reception beam scanning time amounts to 100*100*(1+5+670)+100*670=6.827 seconds. That is, overhead of a considerably long time is generated.

However, channel characteristics vary according to instantaneous movement of a user within a cell coverage due to mmWave properties. If about 7 seconds are taken for beam scanning, it is impossible to provide mmWave services suited to changed channel characteristics. Accordingly, a simpler processing method is required for mmWave link connection through normal beam scanning.

New Type RACH Preamble

Figure 4:
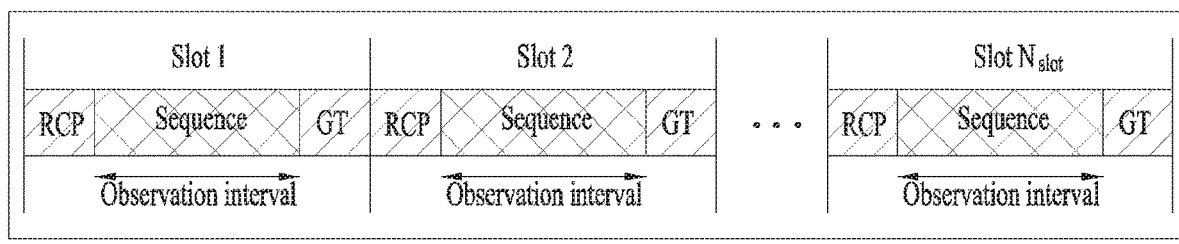
FIG. 4 shows a structure of a random access preamble repeated in a beam direction according to one embodiment of the present invention.

FIG. 4 illustrates a structure of a random access preamble repeated in a beam direction according to an embodiment of the present invention.

$N_{slot}$ PRACH preambles are needed in $N_{slot}$ beam directions during beam scanning. When a time advance (TA) is adjusted, however, a UE can gain an opportunity to transmit a PRACH preamble for synchronization per beam direction without considering an RTT and thus the duration of each preamble can be reduced.

Figure 5:
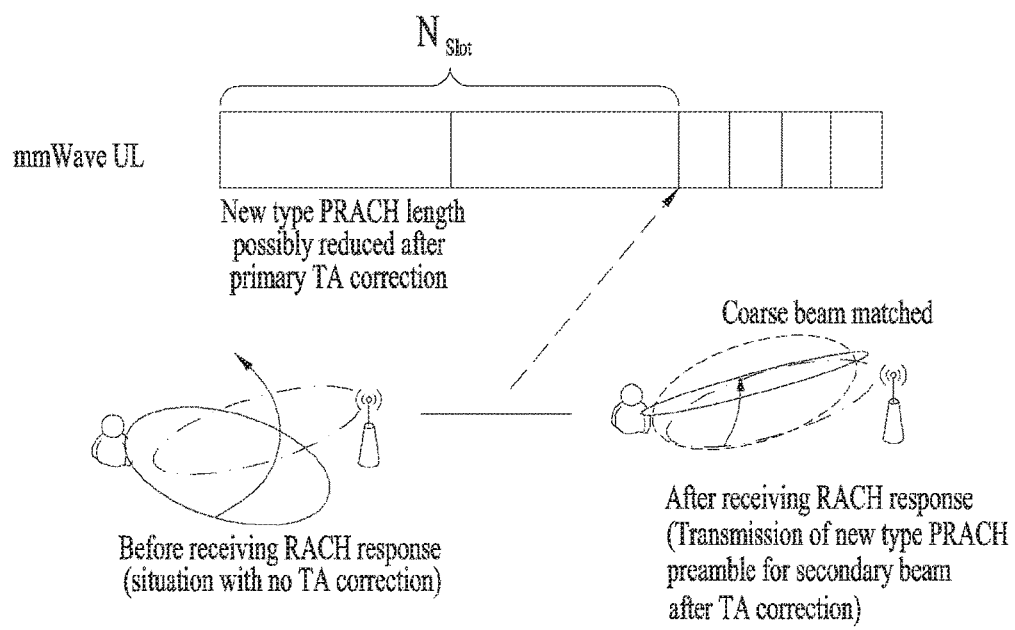
FIG. 5 shows one example of a use of a PRACH preamble of a new type according to one embodiment of the present invention.

FIG. 5 illustrates use of a new type of PRACH preamble according to an embodiment of the present invention.

When a TA is previously adjusted to a coarse beam in a mmWave transmission/reception beam pair, as illustrated in FIG. 5, an RTT need not be considered in PACH preamble transmission corresponding thereto. Accordingly, RACH overhead can be reduced. Overhead can be decreased by transmitting a preamble for the second TA, which corresponds to a symbol duration.

Figure 6:
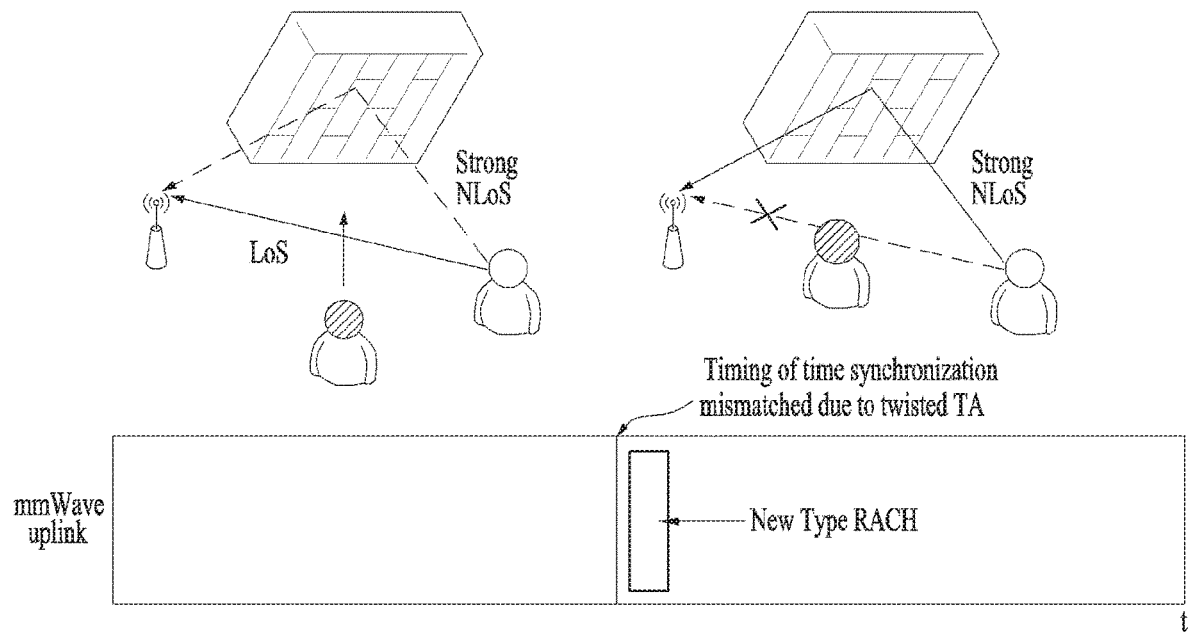
FIG. 6 shows one example of a use of a PRACH preamble of a new type according to another embodiment of the present invention.

FIG. 6 illustrates use of the new type PRACH preamble according to another embodiment of the present invention.

When an LoS (line of sight) link is suddenly disconnected due to abrupt appearance of an obstacle while a mmWave uplink is connected, if an NLoS (non-line of sight) link more robust than the LoS link is available between a UE and a base station, connection can be maintained through the NLoS.

Here, mmWave uplink performance can be enhanced only when synchronization of the robust NLoS line is acquired. Since a TA of a UE is set through an LoS link at present, a new type of PRACH preamble is required to correct asynchronization generated due to switching to NLoS. For example, NLoS excess delay may be about 1.4 μs in big cities.

In an mmWave frame structure with a symbol length of 10.9 μs using an NLoS link having a delay of 1.3 μs, if TA is not matched, CP may exceed 0.5 μs. Hence, it is necessary to match $\Delta_{TA}$ synchronization to a changed NLoS link. Moreover, although NLoS cluster enters the CP, when it is transmitted with reference to the NLoS link (e.g., LoS link blocked state), if a slight $\Delta_{TA}$ correction is made only, link performance can be improved. If an mmWave system considers a new waveform having none of CP or almost none of CP due to a short RMS delay spread property, an RACH preamble of a new type can be used to match uplink synchronization by sending short RACH.

mmWave Link Connection Configuration for Initial Access

In the following, described is a process for a UE RRC-connected to a legacy system performs an initial access to an mmWave system. For example, multiple mmWave cells are adjacent to a UE, and the UE can perform RACH transmission to the mmWave cell. In order for the UE to perform the initial access to the mmWave system, information on mmWave link connection configuration is required. Based on the information on the mmWave link connection configuration, the UE can send a UE-specific contention-free RACH preamble.

For clarity of description, the following items can be assumed. (i) An mmWave cell and an mmWave UE can use a strong NLoS link. (ii) The mmWave cell is co-located with a legacy cell, and the legacy cell and the mmWave UE are in RRC connected state in UL/DL link.

Figure 7:
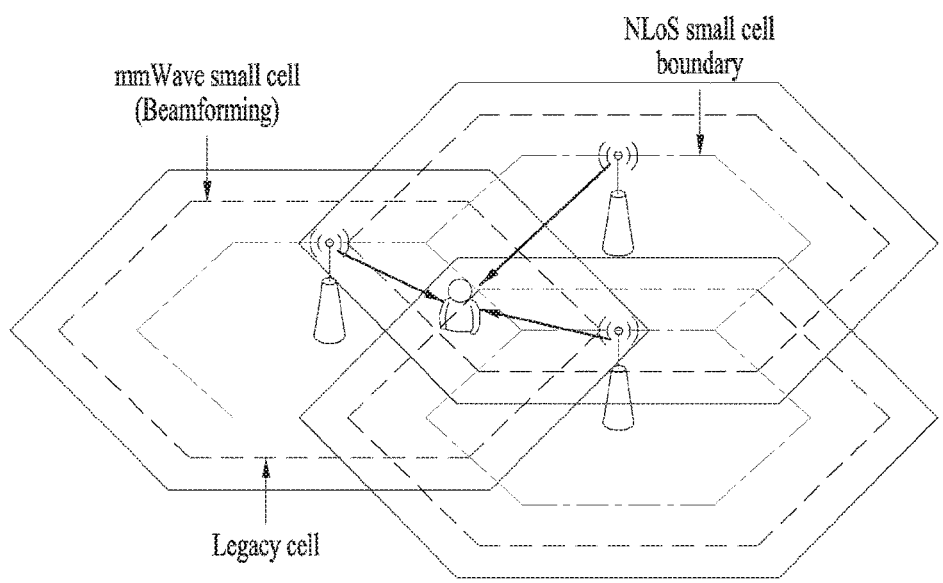
FIG. 7 shows an example of distribution of mmWave cells according to one embodiment of the present invention.

FIG. 7 shows an example of distribution of mmWave cells according to one embodiment of the present invention. Referring to FIG. 7, a legacy cell and an mmWave small cell can be co-located, and a boundary of an NLoS small cell does not exceed a boundary of the mmWave small cell.

An mmWave link is a broadband, has a short coherent time and a relatively small cell boundary. Hence, the mmWave link has a symbol length shorter than that of a legacy band, more symbols are concentrated in a single TTI, and spectral efficiency can be relaxed. Moreover, since the number of users in an mmWave cell is relatively small in comparison with a legacy link, a user-specific reference signal and a control channel can be formed.

And, mmWave system information can be transmitted through a legacy link. System information may include a frame structure index and an mmWave system bandwidth for example, by which the system information is non-limited.

Figure 8:
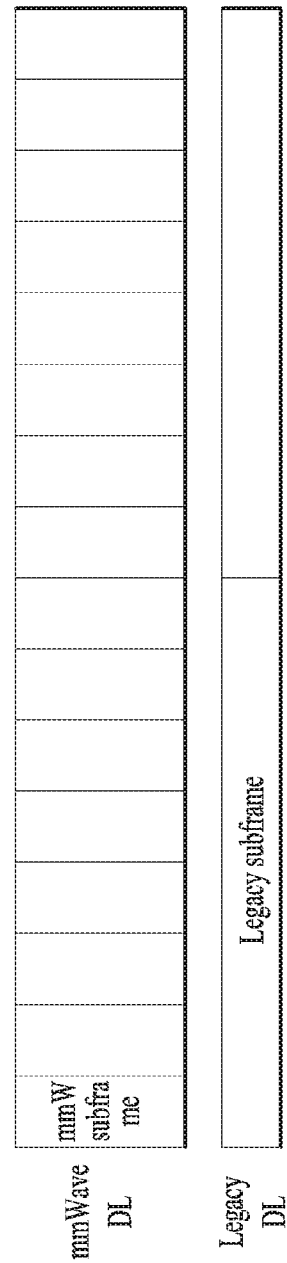
FIG. 8 shows an mmWave frame structure according to one embodiment of the present invention.

FIG. 8 shows an mmWave frame structure according to one embodiment of the present invention. An mmWave subframe may be configured to have a length relatively smaller than that of a legacy frame.

If an mmWave link is based on a beamforming based transmission, a legacy cell having a UE RRC-connected thereto needs to provide information related to beamforming UE-specifically in an mmWave initial access step. Since mmWave channel characteristic differs according to a user's location and various transmission schemes vary according to a situation of each user in performing a beamforming, an mmWave link initial access can be performed more quickly by providing information required for an mmWave initial access beforehand.

According to one embodiment of the present invention, a user equipment (UE), which is RRC-connected to a legacy system and supports mmWave UL/DL transmission, can receive a UE-specific mmWave link connection configuration message through downlink (DL) of the legacy system.

A case of sending an mmWave link connection configuration message may exemplarily include: (i) a case that a service of a high data rate unsupported in a legacy link is required (e.g., UHD movie, UHD real-time streaming, and hologram data transmission); (ii) a case that mmWave RACH transmission is necessary (e.g., a case that UHD video chat, hologram phone call, UHD streaming uploading, etc. is requested by a UE); (iii) a case that services having priorities higher than that of an existing service should be used urgently); and the like, by which the case is non-limited.

The mmWave link connection configuration message may include: (i) mmWave preamble measurement timing configuration (e.g., mmWave DMTC); and (ii) mmWave preamble information, for example. The mmWave DMTC settings may include DMTC periodicity and duration information. The mmWave DMTC may be set to have a periodicity equal to or shorter than that of a legacy DMTC according to mmWave link property, and may be also set in consideration of resolution of the mmWave frame structure.

1. mmWave DMTC

First of all, mmWave DMTC is described.

Figure 9:
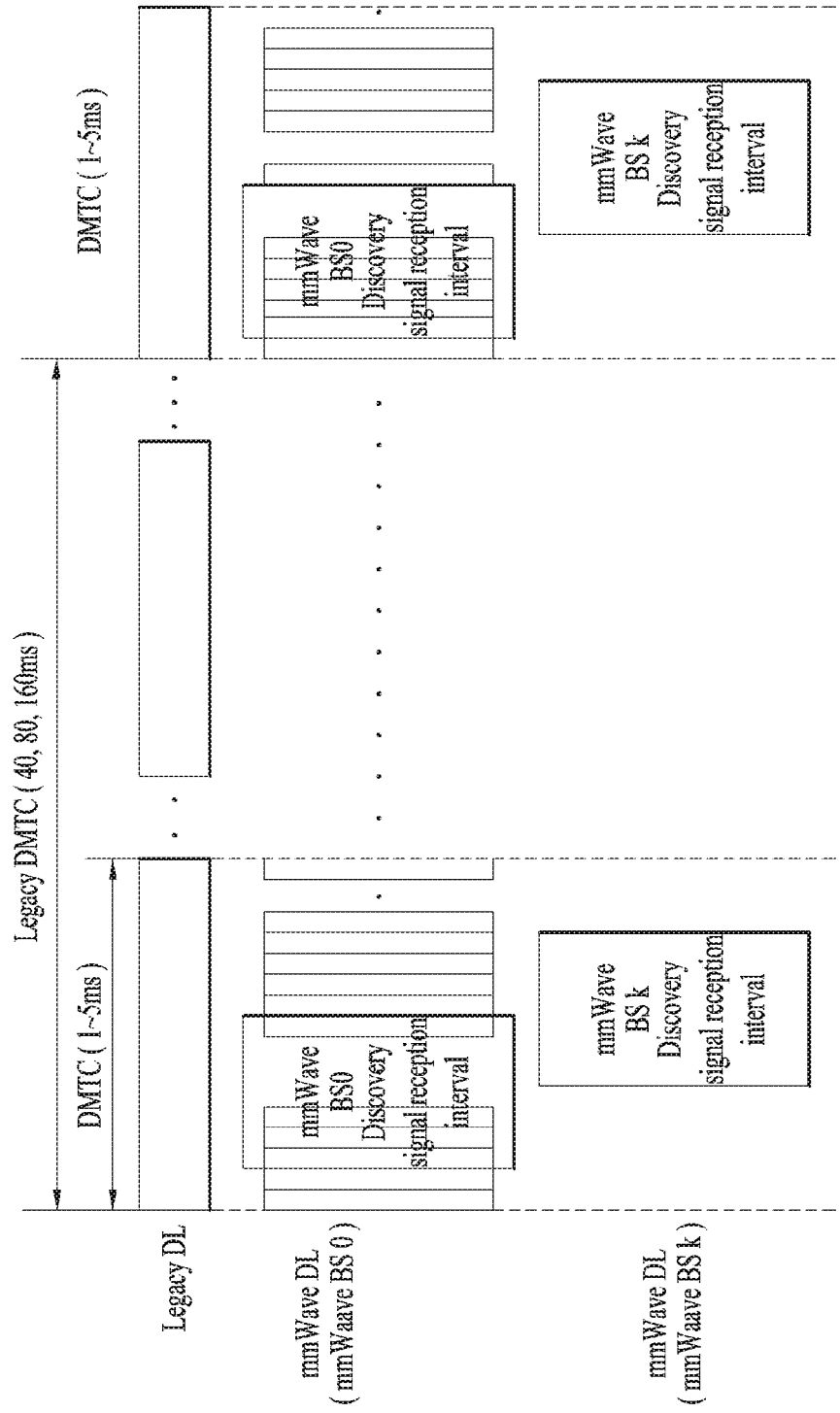
FIG. 9 shows an example of mmWave DMTC periodicity and DMTC duration configuration according to one embodiment of the present invention.

FIG. 9 shows an example of mmWave DMTC periodicity and DMTC duration settings according to one embodiment of the present invention. According to FIG. 9, mmWave DMTC periodicity and DMTC duration are set to match DMTC periodicity.

For example, once legacy DMTC periodicity and DMTC duration are determined, multiple mmWave cells send mmWave preambles, e.g., discovery signals to an mmWave UE based on the legacy DMTC periodicity and the DMTC duration. Hence, a separate configuration is not required for the mmWave DMTC.

Yet, in an environment having a short coherent channel characteristic or a severe channel variation, mmWave DMTC having a periodicity shorter than a legacy DMTC periodicity may be required.

Moreover, when each mmWave cell sends a discovery signal, it is necessary to orthogonally set a frequency of the discovery signal in order for each mmWave to be discriminated from each other within an mmWave TAG (tracking area group).

Figure 10:
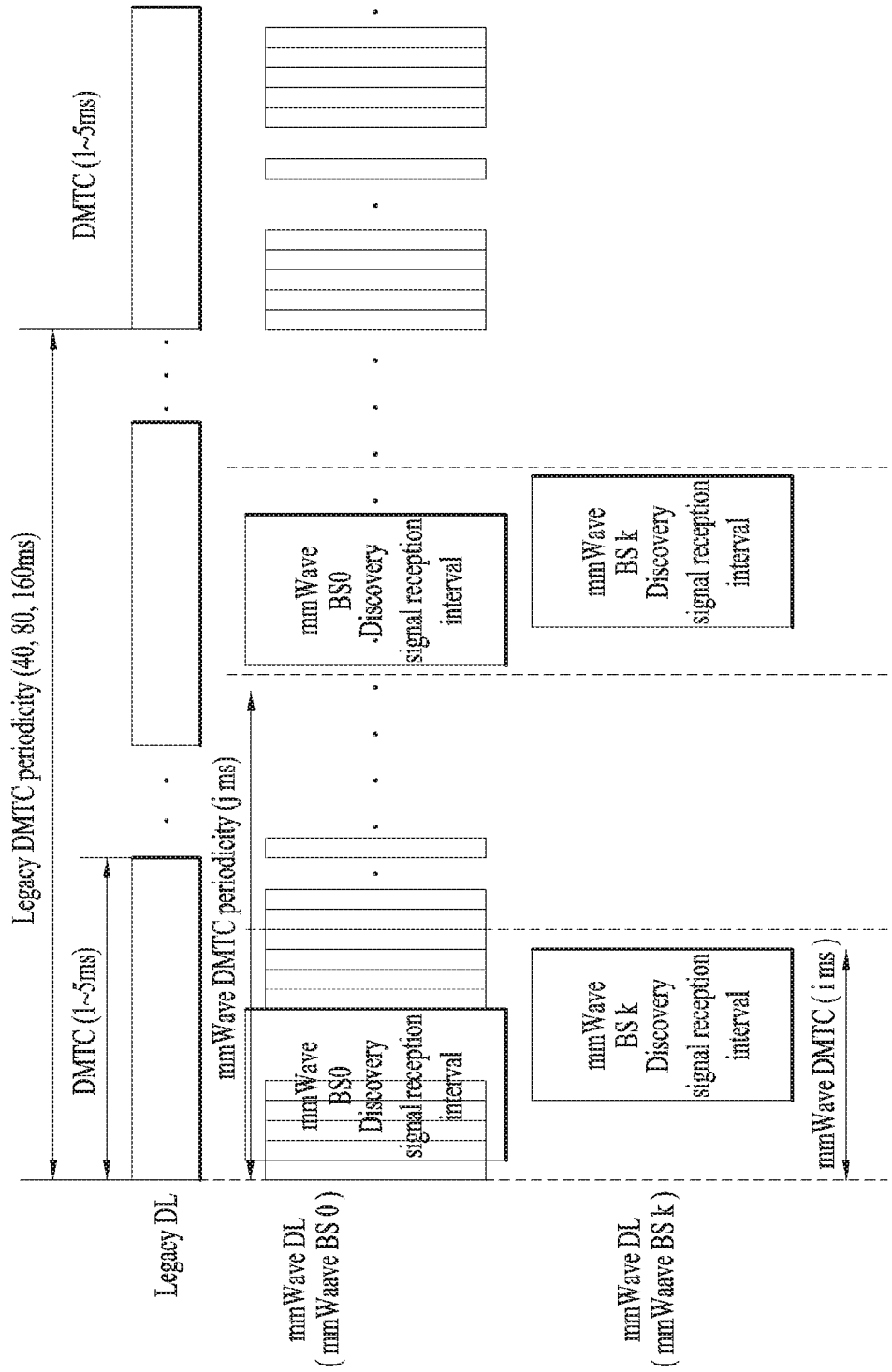
FIG. 10 shows an example of an mmWave DMTC configuration according to another one embodiment of the present invention.

FIG. 10 shows an example of an mmWave DMTC setting according to another one embodiment of the present invention. According to the present embodiment, mmWave DMTC is set to have a periodicity and duration shorter than those of a legacy DMTC.

For example, an mmWave DMTC periodicity is j MS that is set smaller than that of a legacy DMTC. Moreover, considering a short TTI of mmWave, a short mmWave DMTC duration can be set. By setting a short DMTC duration of mmWave, power used for a cell discovery can be reduced. Such an mmWave DMTC periodicity and a DMTC duration can be set through RRC signaling of a legacy cell.

2. mmWave Discovery Signal Information mmWave discovery signal information may be provided for ray scanning (or beam scanning) for example.

mmWave discovery signals may be transmitted on full system band as broadband. Although CRS and CSI-RS as discovery signals may be used to measure RSRP, even if a discovery signal is transmitted on full mmWave band, overhead may not be large owing to symbol or TTI shorter than low frequency TTI. Hence, spectral efficiency on a frequency domain may not be a relatively significant issue in comparison with a legacy system. Hence, a discovery signal may be used as an mmWave preamble, by which the present invention is non-limited. For clarity of the following description, assume that a discovery signal is used as an mmWave preamble.

On such assumption, when an mmWave beam scanning scheme is used for boundary extension of an mmWave link, a discovery signal is transmitted to an mmWave UE from an mmWave cell according to a direction of each beam. The mmWave UE discovers the mmWave cell by measuring the discovery signal within an mmWave DMTC periodicity.

2-(1) mmWave Cell Index, mmWave Discovery Signal Shape & Frequency Information of Discovery Signal According to one embodiment of the present invention, mmWave discovery signal information can include an mmWave cell index, a shape of an mmWave discovery signal and frequency information of a discovery signal. For example, an mmWave cell index connectible according to a location of each mmWave UE, mmWave discovery signal shape information and a frequency resource location for transmitting a discovery signal in each mmWave cell can be provided to a UE.

It is necessary to set up transmission configuration of discovery signals determined on the basis of TAG (tracking area group) of each mmWave UE and mmWave DMTC of the mmWave UE in advance.

Figure 11:
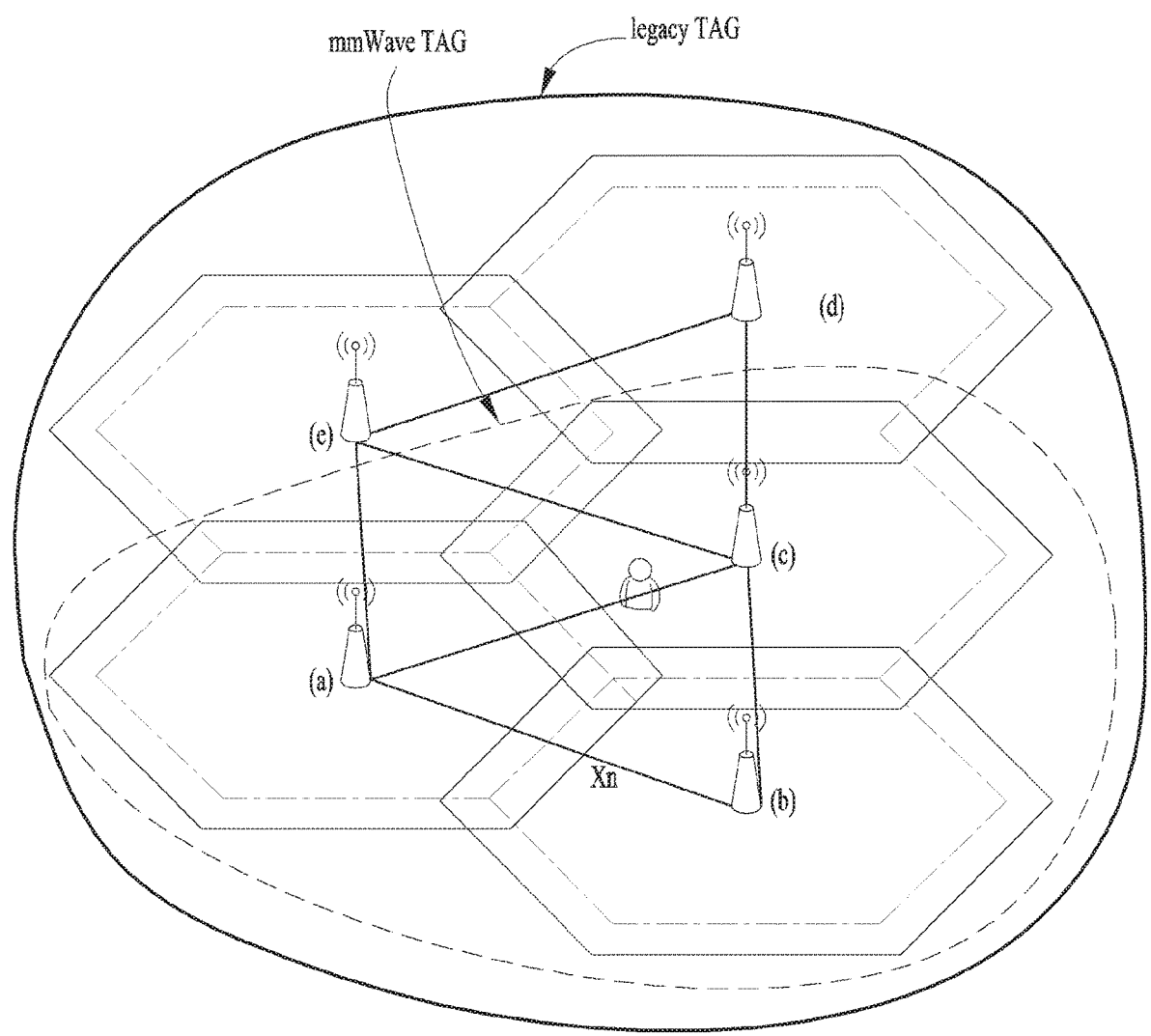
FIG. 11 shows an example of mmWave TAG and Xn interface according to one embodiment of the present invention.
Figure 12:
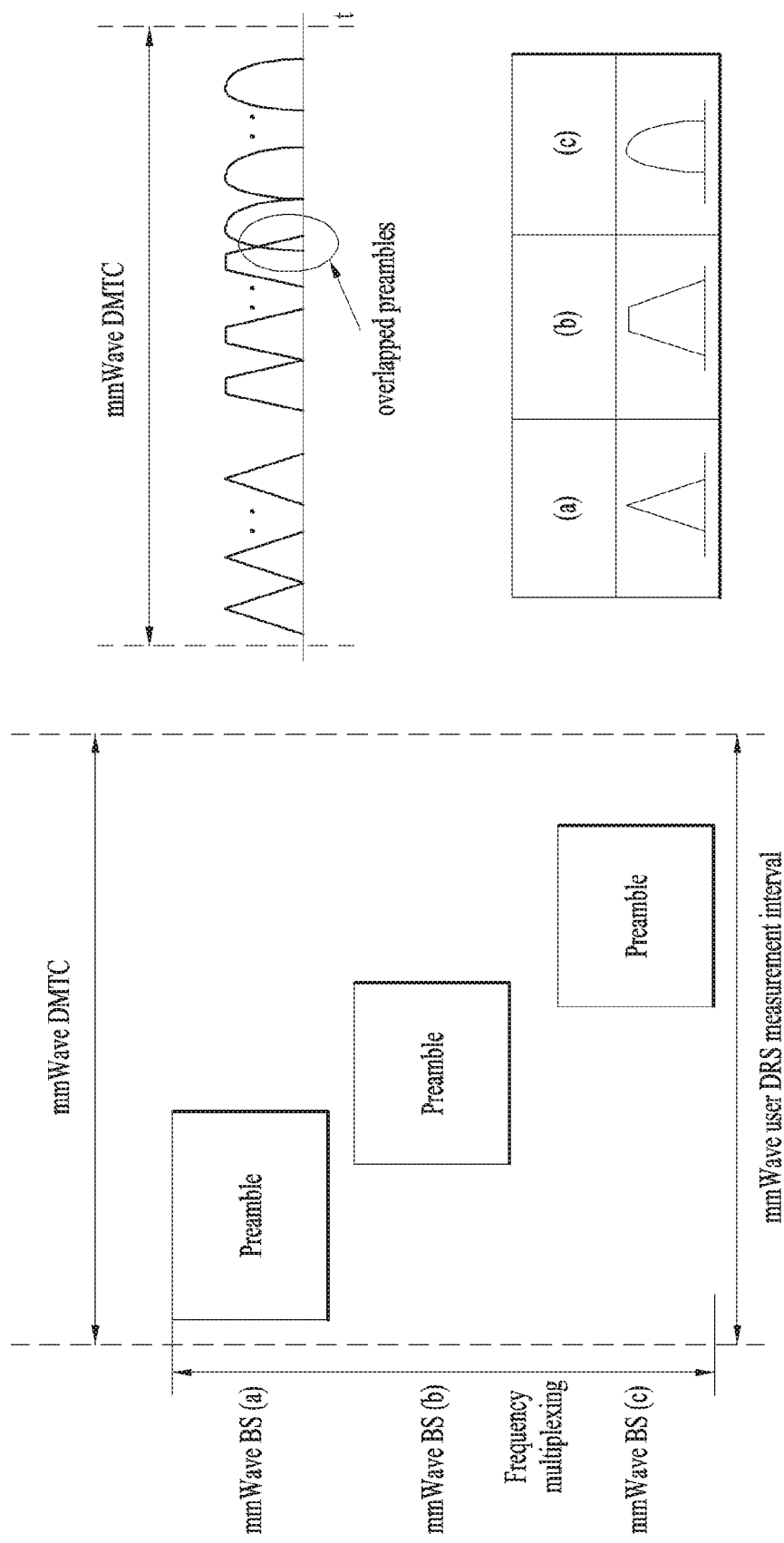
FIG. 12 shows an example of mmWave TAG and discovery signal configuration according to an mmWave UE location.

FIG. 11 shows an example of mmWave TAG and Xn interface according to one embodiment of the present invention. Referring to FIG. 11, an mmWave TAC of an mmWave UE includes an mmWave cell (a), an mmWave cell (b) and an mmWave cell (c). FIG. 12 shows an example of mmWave TAG and discovery signal settings according to an mmWave UE location.

When an mmWave TAG of an mmWave UE includes an mmWave cell (a), an mmWave cell (b) and an mmWave cell (c), discovery signals may overlap with each other due to propagation delay from each mmWave cell to the mmWave UE. Hence, in order to enable the UE to discriminate that a discovery signal is transmitted from a prescribed mmWave cell, a frequency region for each mmWave cell to transmit a discovery signal can be set orthogonal to each other.

Moreover, in a time domain, in order to discriminate a discovery signal transmitted by each mmWave cell, a discovery signal of each mmWave cell can be configured in different shape within an mmWave TAG.

2-(2) mmWave Discovery Signal Transmission Timing Index

According to one embodiment of the present invention, an index of a transmission timing of an mmWave discovery signal can be provided as mmWave discovery signal information.

Figure 13:
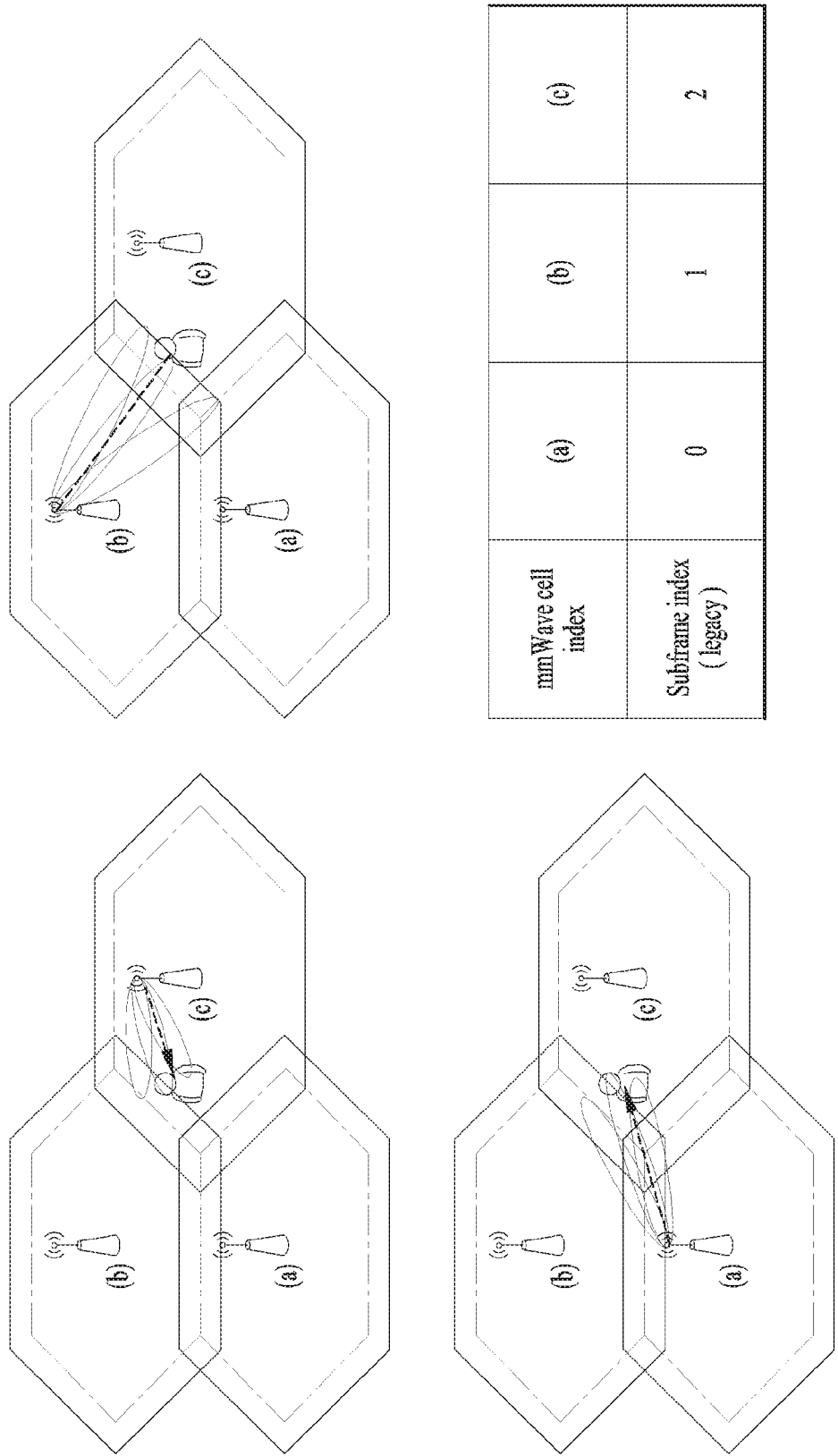
FIG. 13 shows an example of a timing configuration for transmitting an mmWave discovery signal from a cell of mmWave TAG according to one embodiment of the present invention.

FIG. 13 shows an example of a timing setting for transmitting an mmWave discovery signal from a cell of mmWave TAG according to one embodiment of the present invention.

Referring to FIG. 13, as discovery signal transmission timings of mmWave cells within each mmWave TAG are set different from each other, mmWave discovery signals of the mmWave cells can be configured not to overlap each other. Hence, when an mmWave UE detects a discovery signal, it is able to minimize an error due to the discovery signal overlapping.

2-3 Discovery Signal Pattern Information & Beam Resolution Information

According to one embodiment of the present invention, discovery signal pattern information and beam resolution information can be provided as mmWave discovery signal information.

In order to reduce vagueness of discovery signal estimation, a pattern of a discovery signal is usable. A different pattern can be set for an mmWave discovery signal in each mmWave cell. For example, if an mmWave UE receives an mmWave discovery signal, it performs autocorrelation with a waveform in the shape set in each mmWave cell and can be aware that a maximum power appears in a prescribed beam direction in determining a place corresponding to a peak of the autocorrelation.

Figure 14:
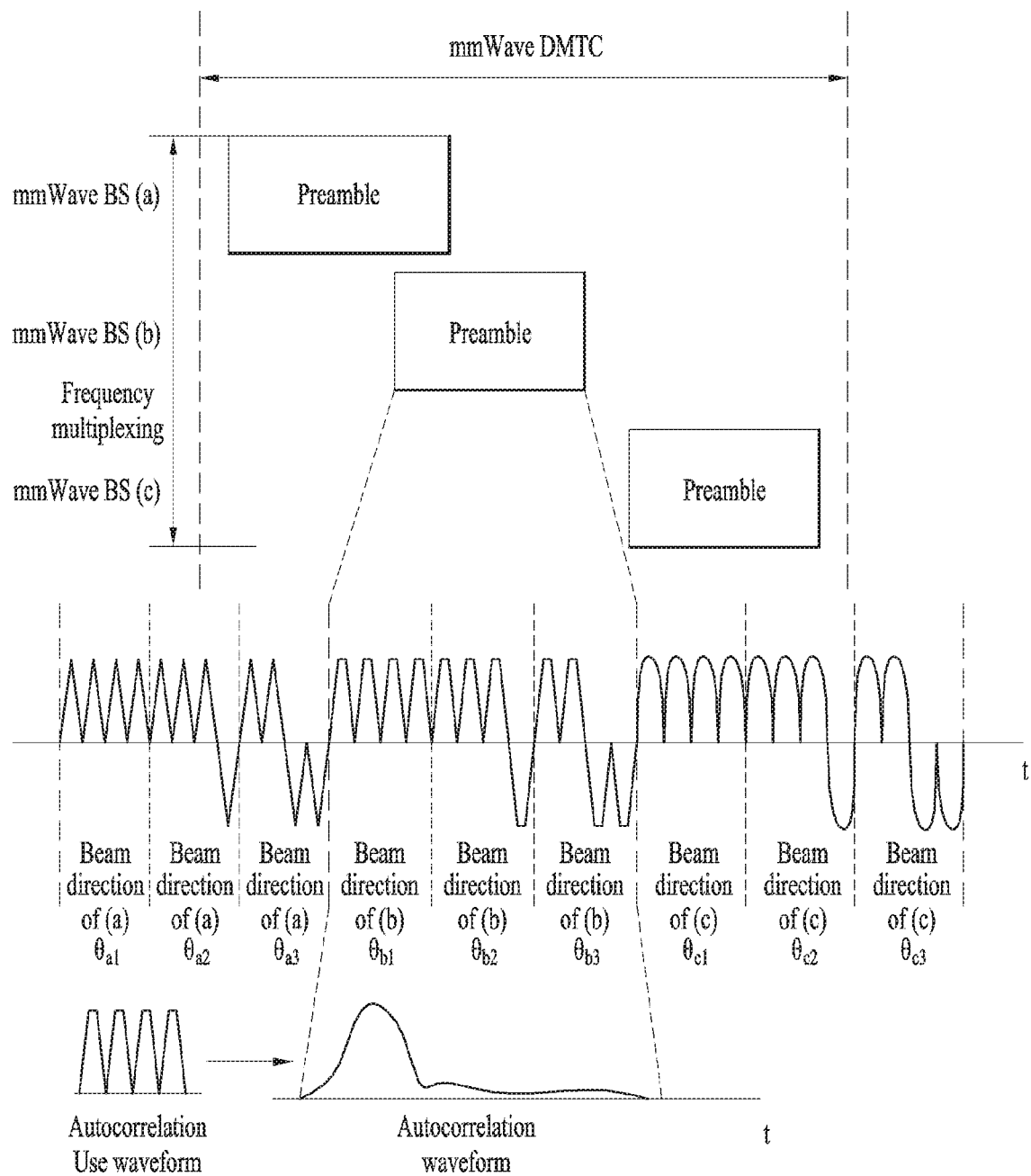
FIG. 14 is a diagram to describe a method of determining a beam direction by performing auto-correlation according to one embodiment of the present invention.

FIG. 14 is a diagram to describe a method of determining a beam direction by performing auto-correlation according to one embodiment of the present invention.

Particularly, when a discovery signal is transmitted from each of mmWave cells (a), (b) and (c), a process for checking that a repletion power of the discovery signal becomes a maximum in a prescribed beam direction of the mmWave cell (b) is illustrated.

As resolution of a coarse beam is set to 120 degrees in a 2D plane, assume that a discovery signal is transmitted by beamforming in three directions.

After receiving the discovery signal, the mmWave UE performs autocorrelation, thereby determine a direction in which a received power of the discovery signal is maximized.

In FIG. 14, a reception power of a discovery signal is maximized at $\theta_{b1}$ of the mmWave cell (b). Hence, a direction of a beam for an initial access is determined as 120 degrees.

2-(4) mmWave Discovery Signal Length τ

According to one embodiment of the present invention, mmWave discovery signal length information can be provided as mmWave discovery signal information.

For example, as mmWave discovery signal length information is provided, a reference of an mmWave frame index can be set with reference to a beam direction selected by beam scanning. Moreover, based on mmWave discovery signal length information, an mmWave data transmission timing can be implicitly indicated.

If an autocorrelation of a discovery signal transmitted in $M^{th}$ order among total N discovery signal transmissions indicates a highest peak, a UE can be aware that data is transmitted in an mmWave link behind a time offset amounting to (N−m)τ.

If a detection of a first transmitted discovery signal fails, since a transmission timing of the discovery signal is unknown, the UE is unable to know when data is transmitted in mmWave downlink (DL).

Figure 15:
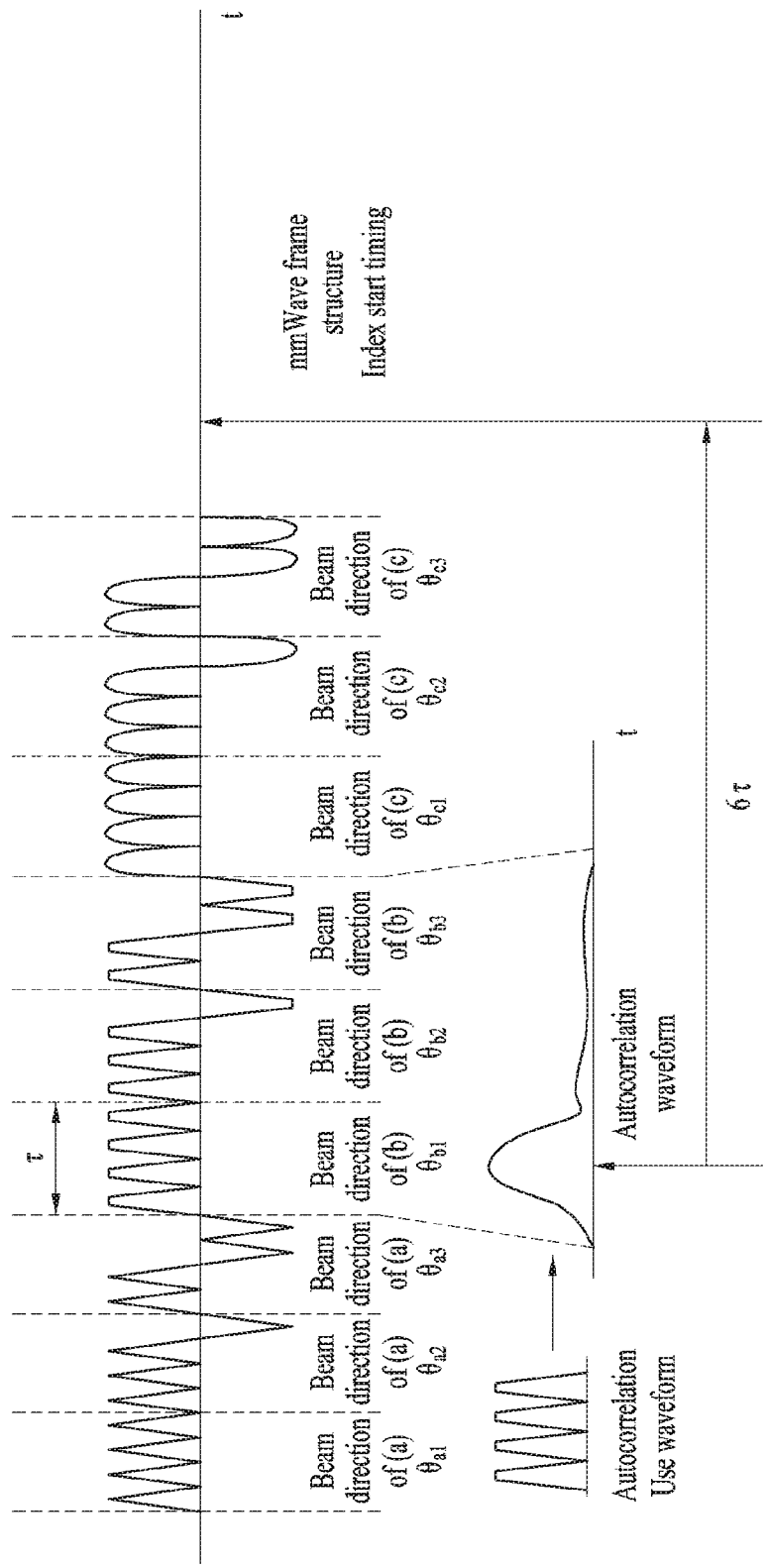
FIG. 15 is a diagram to describe a method of determining a transmission timing of mmWave downlink data according to one embodiment of the present invention.

FIG. 15 is a diagram to describe a method of determining a transmission timing of mmWave downlink data according to one embodiment of the present invention.

Assume that a maximum value of a peak of autocorrelation is detected in a direction $\theta_{b1}$ of an mmWave cell (b). Based on a beforehand received τ value and how many times a discovery signal is transmitted after $\theta_{b1}$, a UE can obtain an mmWave data transmission timing and an mmWave frame index.

mmWave RACH Procedure

Figure 16:
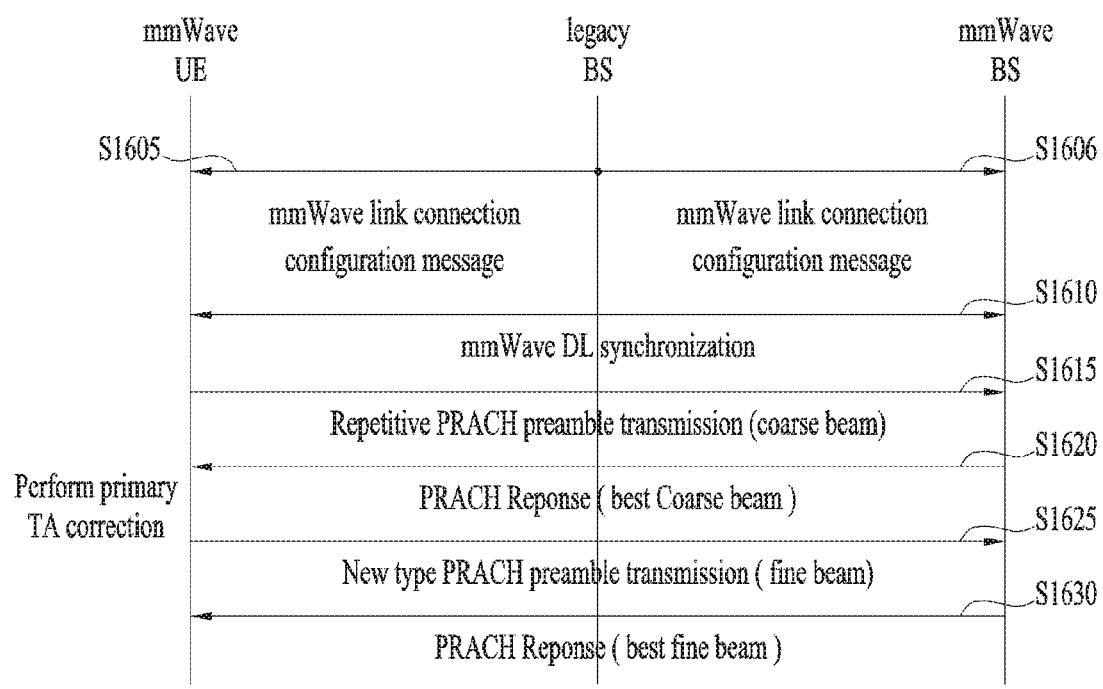
FIG. 16 is a flowchart of a non-contention based random access procedure of an mmWave system according to one embodiment of the present invention.

FIG. 16 is a flowchart of a non-contention based random access procedure of an mmWave system according to one embodiment of the present invention.

According to the present embodiment, a new type RACH preamble is used for time synchronization for a fine beam. Hence, the new type RACH preamble is usable after matching TA of mmWave uplink for a coarse beam.

First of all, a legacy cell sends an mmWave link connection configuration message to a UE and an mmWave cell [S1605, S1606]. RACH timing information may be included in mmWave link connection configuration information sent to the mmWave cell.

The UE performs downlink synchronization with the mmWave cell [S1610].

The UE repetitively transmits a PRACH preamble [S1615]. The repetitive transmission of the PRACH preamble is a training for coarse beams formed in different directions and is provided to search for a coarse beam in which a maximum gain appears. For a PRACH preamble transmitted for a coarse beam, a pattern of a RACH preamble defined in the current LTE/LTE-A is usable.

The UE receives a PRACH response from the mmWave cell [S1620]. The PRACH response may be provided for a best coarse beam having a maximized gain of a beamforming. Based on the PRACH response, the UE performs a primary TA correction on an optimal coarse beam.

Thus, if the UE is primarily matched for the optimal coarse beam, the UE can transmit a new type RACH preamble mentioned in the above description [S1625]. The new type RACH preamble can be transmitted for secondary TA acquisition for a fine beam.

The UE receives a PRACH response from the mmWave cell [S1630]. The PRACH response is a response for an optimal fine beam. Based on this, the UE performs a secondary TA correction.

Meanwhile, the RACH preamble for the coarse beam and the new type RACH preamble for the fine beam are illustrated as a series of consecutive procedures in FIG. 16, by which the present invention is non-limited. For other embodiments of transmitting a new type RACH preamble for a fine beam, when a link is changed from LoS into NLoS in an already TA matched situation, and vice versa, a new type RACH preamble can be transmitted in a periodicity shorter than an existing RACH transmission periodicity.

A new type PRACH configuration for a fine beam can be transmitted in a mixed form with a PRACH configuration for a coarse beam or through an independent configuration.

Figure 17:
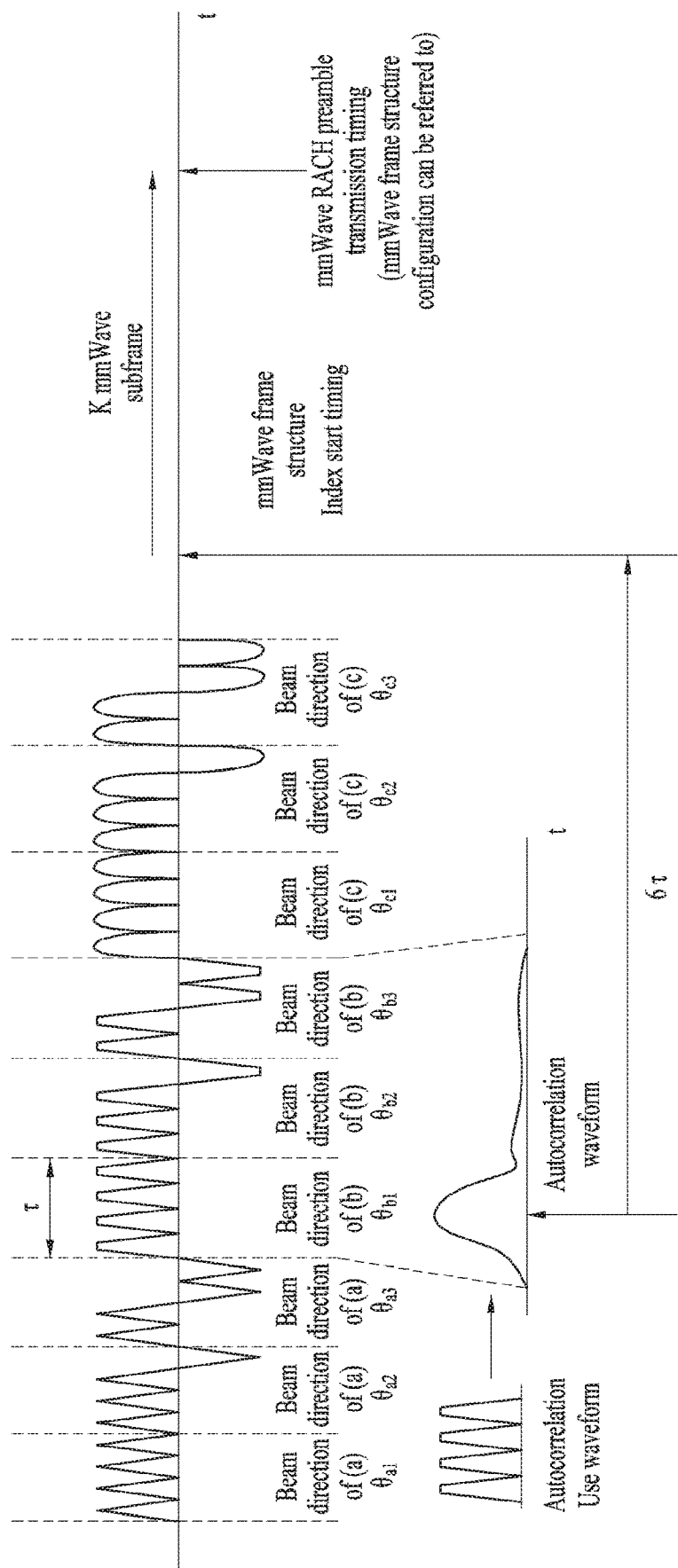
FIG. 17 shows an example of an mmWave subframe index for mmWave RACH preamble transmission according to one embodiment of the present invention.

FIG. 17 shows an example of an mmWave subframe index for mmWave RACH preamble transmission according to one embodiment of the present invention.

According to an embodiment of FIG. 17, a subframe index for transmission timing of mmWave RACH may be transmitted in downlink of mmWave or provided to a UE through an mmWave link connection configuration message. Meanwhile, since it is already determined that the UE will be connected to a prescribed mmWave cell in uplink, the aforementioned RACH procedure can be performed according to a beam direction of the UE for uplink.

Figure 18:
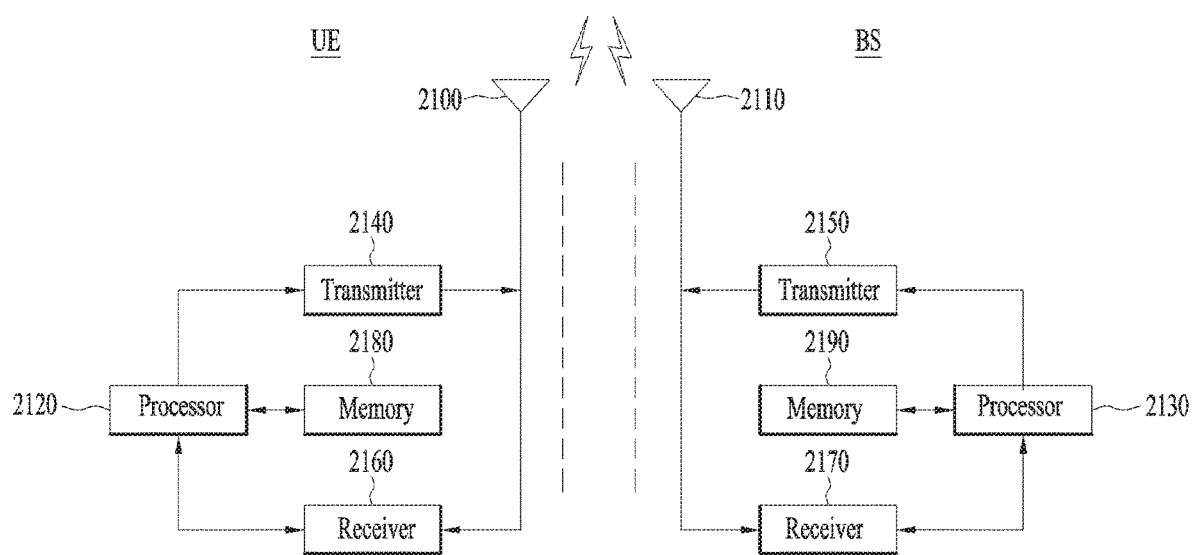
FIG. 18 shows a user equipment and a base station according to one embodiment of the present invention.

FIG. 18 illustrates a UE and a base station according to an embodiment of the present invention. The UE and the base station illustrated in FIG. 18 can perform the above-described embodiments.

The UE may serve as a transmitter on uplink and serve as a receiver on downlink. The base station may serve as a receiver on uplink and serve as a transmitter on downlink.

That is, the UE and the base station may respectively include Tx modules 2140 and 2150m and Rx modules 2150 and 2170 for controlling transmission and reception of information, data and/or messages, and antennas 2100 and 2110 for transmitting and receiving information, data and/or messages.

In addition, the UE and the base station may respectively include processors 2120 and 2130 for performing the above-described embodiments and memories 2180 and 2190 for temporarily or continuously storing processing results of the processors.

The embodiments of the present invention can be performed using the components and functions of the UE and the base station.

The transmission modules and the reception modules included in the UE and the base station can perform packet modulation and demodulation functions for data transmission, a fast packet channel coding function, orthogonal frequency division multiple access (OFDMA) packet scheduling, time division duplex (TDD) packet scheduling and/or channel multiplexing. Further, the UE and the base station illustrated in FIG. 12 may further include a low power radio frequency (RF)/intermediate frequency (IF) module.

In the present invention, a personal digital assistant (PDA), a cellular phone, a personal communication service (PCS) phone, a global system for mobile (GSM) phone, a wideband CDMA (WCDMA) phone, a mobile broadband system (MBS) phone, a handheld PC, a notebook PC, a smartphone, a multi-mode multi-band (MM-MB) terminal or the like may be used as the UE.

Here, the smartphone is a terminal having advantages of a mobile communication terminal and a personal portable terminal and may refer to a terminal configured in such a manner that a data communication function such as schedule management, facsimile transmission/reception and Internet access are integrated into a mobile communication terminal. The MM-MB terminal refers to a terminal including a multi-modem chip to operate in a mobile Internet system and other mobile communication systems (e.g., CDMA (Code Division Multiple Access) 2000 system, WCDMA (Wideband CDMA) system, etc.).

The embodiments of the present invention may be achieved by various means, for example, hardware, firmware, software, or a combination thereof.

In a hardware configuration, the methods according to the embodiments of the present invention may be achieved by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

In a firmware or software configuration, the embodiments of the present invention may be implemented in the form of a module, a procedure, a function, etc. For example, software code may be stored in the memory unit 2180 and 2190 and executed by the processor 2120 and 2130. The memory unit may be located at the interior or exterior of the processor and may transmit data to and receive data from the processor via various known means.

Those skilled in the art will appreciate that the present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein.

INDUSTRIAL APPLICABILITY

The embodiments of the present invention are applicable to various wireless access systems. Examples of various wireless access systems include 3GPP (3rd Generation Partnership Project), 3GPP2 and IEEE 802.xx (Institute of Electrical and Electronic Engineers 802). The embodiments of the present invention can be applied to not only the various wireless access systems but also to all technical fields employing the various wireless access systems.

What is claimed is:

1. A method for a user equipment to access a millimeter wave cell in a wireless communication system supporting millimeter wave (mmWave), the method comprising:
    receiving a mmWave connection configuration message repeatedly including first information about a waveform of a discovery signal for each of mmWave cells, second information about transmission timing of the discovery signal for each of the mmWave cells, and third information about a length of the discovery signal for each of the mmWave cells, from a legacy cell which is different from the mmWave cells and is radio resource control (RRC) connected to the user equipment;
    performing autocorrelation a total of N×M times based on the waveform of the discovery signal specific to each of the mmWave cells;
    detecting a value of a peak that is maximized among the N×M autocorrelations;
    selecting a beamforming direction and a mmWave cell corresponding to the maximized value of the peak; and
    transmitting a first type random access preamble to the selected mmWave cell,
    wherein the waveform of the discovery signal and the length of the discovery signal are configured to be specific to each of the mmWave cells,
    wherein a frame of the selected mmWave cell starts at a second point that is offset from a first point in which the value of the peak is maximized,
    wherein a size of the offset is (N−m)×τ,
    wherein 'N' indicates a number of the mmWave cells, 'M' indicates beamforming resolution of the discovery signals, 'm' indicates a number of times the discovery signal is repeatedly transmitted until the value of the peak is maximized, and 'τ' indicates the length of the discovery signal in the mmWave connection configuration message.

2. The method of claim 1, wherein the mmWave cell to which the first type random access preamble is transmitted comprises the mmWave cell corresponding to the maximized value of the peak.

3. The method of claim 1,
    wherein the mmWave cells belong to a timing advance group (TAG) of the user equipment and
    wherein the mmWave cells in the TAG transmit the discovery signals through different waveforms and different frequency resources.

4. The method of claim 1,
    wherein the mmWave connection configuration message includes a mmWave discovery measurement timing configuration (DMTC) indicating a measurement periodicity and a measurement duration of the discovery signals and
    wherein the measurement periodicity and the measurement duration indicated by the mmWave DMTC are configured to be smaller than a measurement periodicity and a measurement duration indicated by a legacy DMTC, respectively.

5. The method of claim 1, further comprising:
    performing a primary timing advance (TA) correction based on a response to the first type random access preamble; and
    transmitting a second type random access preamble to the mmWave cell based on an uplink synchronization timing which is corrected by the primary TA correction.

6. A user equipment supporting millimeter wave (mmWave), the user equipment comprising:
    a receiver to receive a mmWave connection configuration message repeatedly including first information about a waveform of a discovery signal for each of mmWave cells, second information about transmission timing of the discovery signal for each of the mmWave cells, and third information about a length of the discovery signal for each of the mmWave cells, from a legacy cell which is different from the mmWave cells and is radio resource control (RRC) connected to the user equipment;
    a processor to perform autocorrelation a total of N×M times based on the waveform of the discovery signal specific to each of the mmWave cells, detect a value of a peak that is maximized among the N×M autocorrelations, and select a beamforming direction and a mmWave cell corresponding to the maximized value of the peak; and
    a transmitter to transmit a first type random access preamble to the selected mmWave cell,
    wherein the waveform of the discovery signal and the length of the discovery signal are configured to be specific to each of the mmWave cells,
    wherein a frame of the selected mmWave cell starts at a second point that is offset from a first point in which the value of the peak is maximized,
    wherein a size of the offset is (N−m)33 τ,
    wherein 'N' indicates a number of the mmWave cells, 'M' indicates beamforming resolution of the discovery signals, 'm' indicates a number of times the discovery signal is repeatedly transmitted until the value of the peak is maximized, and 'τ' indicates the length of the discovery signal in the mmWave connection configuration message.

7. The user equipment of claim 6, wherein the mmWave cell to which the first type random access preamble is transmitted comprises the mmWave cell corresponding to the maximized value of the peak.

8. The user equipment of claim 6,
wherein the mmWave cells belong to a timing advance group (TAG) of the user equipment and
wherein the mmWave cells in the TAG transmit the discovery signals through different waveforms and different frequency resources.

9. The user equipment of claim 6, wherein the mmWave connection configuration message includes a mmWave discovery measurement timing configuration (DMTC) indicating a measurement periodicity and a measurement duration of the discovery signals and
wherein the measurement periodicity and the measurement duration indicated by the mmWave DMTC are configured to be smaller than a measurement periodicity and a measurement duration indicated by a legacy DMTC, respectively.

10. The user equipment of claim 6,
wherein the processor performs a primary timing advance (TA) correction based on a response to the first type random access preamble and
wherein the transmitter transmits a second type random access preamble to the mmWave cell based on an uplink synchronization timing which is corrected by the primary TA correction.

* * * * *